(No Model.)
G. W. SESSIONS.
METHOD OF PREPARING AND BOTTLING WINES.
No. 467,757. Patented Jan. 26, 1892.
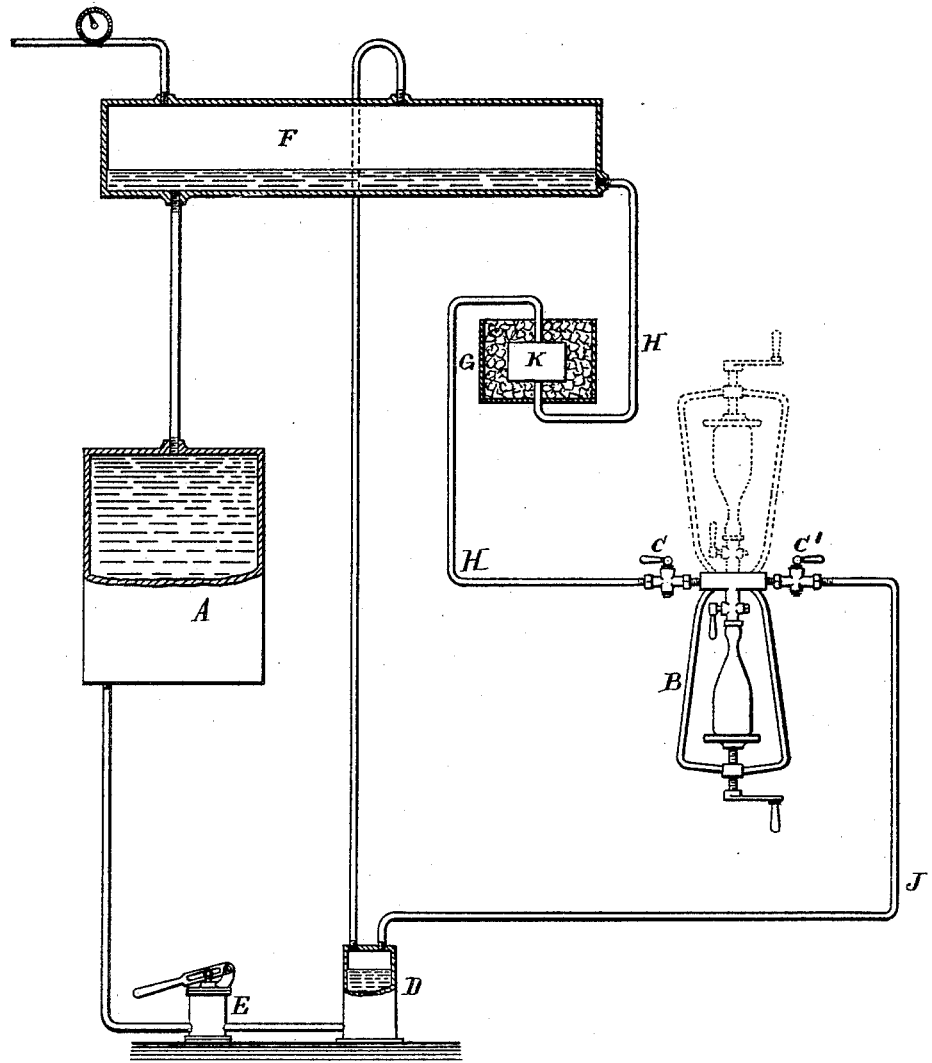
Witnesses:
J. Staib
Chas H Smith
Inventor:
George W. Sessions
per Lemuel W. Serrell atty

UNITED STATES PATENT OFFICE.

GEORGE W. SESSIONS, OF NEW YORK, N. Y.

METHOD OF PREPARING AND BOTTLING WINES.

SPECIFICATION forming part of Letters Patent No. 467,757, dated January 26, 1892.

Application filed November 7, 1890. Serial No. 370,692. (No model.)

*To all whom it may concern:*

Be it known that I, GEORGE W. SESSIONS, a citizen of the United States, residing in the city and State of New York, have invented an Improved Method of Preparing and Bottling Wines, of which the following is a specification.

Champagne as usually prepared is bottled and allowed to remain with the corks downwardly for the liquid to clarify and any sediment to accumulate upon the cork. The sediment is disgorged by the cork being withdrawn with dexterity after the liquid has been cooled to a low temperature, so as to prevent the loss of carbonic-acid gas, and the empty space caused by disgorging is then filled with liquor and a small quantity of sugar and the corks inserted again. To perform these operations requires skilled labor, and it is attended with more or less loss, especially in labor in performing the respective bottling operations.

The object of the present invention is to provide for more rapidly and reliably preparing and bottling champagne and similar wines, and by my improvements I am enabled to either dispense with the first bottling operation or else to pursue the bottling operations with regularity and progressively in such a manner that the wine is subjected to a sufficient fermentation previous to the bottling operation for insuring the proper condition when bottled.

In the drawing I have shown an elevation of an apparatus adapted to the carrying out of my improved method, the containing-vessels and refrigerator being partially in section.

A is a ferment-vat.

B is a bottle-holding device.

C C' are the cocks to the respective pipes.

D is a receiver, E a pump, and F a reservoir containing carbonic-acid gas, and I remark that the devices for holding the bottle may be similar to that represented in Patent No. 357,098, granted February 1, 1887, wherein the holder may be turned upside down to invert the bottle for emptying the contents or brought down vertically for receiving the liquid.

In carrying out my method I take still wine in a condition adapted to my process and add a small quantity of young wine, together with the proper proportion of sugar for forming carbonic-acid gas and sweetening the wine.

The ferment-vat A is now to be nearly filled with this liquid, and it is to be allowed to stand a sufficient time for the germs in the young wine to set up a ferment and give to the whole wine the necessary quality, and it develops carbonic-acid gas, and carbonic-acid gas may be supplied at any time into the vessel F or into the ferment-vat A, so as to obtain the required quantity of gas and pressure, and I remark that the ferment-vat A should be at the proper temperature for the germs of the young wine to act as before described, and I make use of a refrigerator G to cool the wine as it passes by the pipe H from the vessel F to the cock C of the bottling apparatus. As soon as the liquid in the vat A is in the proper condition, which may occupy from one to three weeks, old wine of the same quality is mixed with young wine and sugar in the same proportion as originally introduced into the vat A, and this wine is to be pumped into the lower part of the vat A sufficiently to cause the wine in the upper part of the vat to pass from the vessel A and fill the pipes to the bottling apparatus, and when the vessel F is between the vat A and the bottling apparatus the wine will pass through the same, and bottles are filled with this mixture of old and young wine and sugar, the same having been cooled, and such bottles are introduced in succession in the bottle-holder, and the bottle is inverted and the cock C' opened, and the carbonic-acid gas in the upper part of the vessel F and receiver D passes under pressure through the pipe J and cock C' into the bottle, and the contents of the bottle simultaneously run out and back into the receiver D. As soon as the bottle is empty the cock C' is closed, the bottle turned downwardly, and the cock C is opened, and the wine runs from the vessel F through the refrigerator G, where its temperature is reduced, so as to prevent the carbonic-acid gas passing off too freely, and thence the liquid passes into the bottle, and as soon as the bottle is filled the cock C is closed and the bottle transferred to a corking apparatus for introducing and wiring the cork, as usual; and it is generally preferable to make use of a filter K, connected with the pipe H, for keeping back any germs from the vat A, so that the liquid passing into the bottle will be clearer and in proper condition, and this filter may be in the tub containing ice and forming the refrigerator G. The receiver D may be comparatively small, and the liquid from the same is passed by the pump E progressively into the vat A, and in that vat the fermentation takes place, and the germs from the young wine that had been added to the old act upon the liquid so as to produce the proper condition thereof gradually, and where the vat A is of proper size in proportion to the bottling capacity the aforesaid operations may be continued indefinitely, because the liquid will remain in the vat A a sufficient length of time to properly ferment and clarify, and in this manner I am enabled to avoid the introduction of any special ferment in the form of vegetable fiber with fungoid growth upon the same, and there is no foreign matter introduced into the apparatus.

In cases where the wine or champagne has been bottled the present improvements may be made use of, in which case the bottles are to be cooled to avoid loss of carbonic-acid gas and the vessel A is to be filled with such wine and a mixture therewith of a proper quantity of young wine and sugar, which act as before described, and the wine is allowed to run from the bottles through the cocks C' into the receiver D, and from there it is pumped into the vat A from time to time, together with sufficient young wine and sugar to continue the fermenting, clarifying, and sweetening operations, as before described, and the wine, drawn from the vat A by the cock C in filling the bottle, is in the proper condition for sale or use, the same having undergone progressively the clarifying operation in the vat A. The wine might be drawn directly from the vat A; but the same is usually passed up into the vessel F, in which the carbonic-acid gas is maintained under proper pressure. If desired, more than one vat A may be made use of, so that the vats may be supplied and drawn upon in succession.

By the term "bottle" I include any vessel suitable for containing the wine in a merchantable condition and under pressure.

It is to be understood that in consequence of the wine being supplied by the pump E very gradually into the bottom of the vessel A there is but little disturbance of the contents, and sediment that may result from the ferment subsides to the bottom, and the process of clarification is upwardly, and the wine in its proper condition passes from the top of the vessel A up into the vessel F. In most establishments carbonic-acid gas is provided under pressure, and the same is to pass into the vessel F by a pipe to maintain the proper pressure thereof in the entire apparatus, and this is specially required where there is not sufficient gas evolved in the clarifying operation that is going on in the vessel A.

By the operations performed in my improvement there is but little if any loss of wine. The emptying and filling follow each other without loss of time or rehandling, and by refrigerating the wine directly in its passage from the closed vessels to the filler the loss of carbonic acid is reduced to a minimum when the bottle is removed from the filler for corking.

I claim as my invention—

1. The method herein specified of preparing and bottling wine, consisting in passing the contents of the bottles into a receiver and pumping it into the bottom of a vat containing young wine and sugar, maintaining a pressure in the apparatus, allowing the liquid to remain a sufficient time in the vat for the fermentation set up by the germs in the young wine, and passing off the wine from the upper part of the vat in its proper condition for bottling, the supply to and delivery from the vat being progressive, so that the liquid will remain in the vat a sufficient time for the fermenting and clarifying operations, substantially as set forth.

2. The method herein specified of preparing and bottling wine, consisting in progressively introducing into a vat old wine with a mixture of young wine and sugar, allowing the contents to ferment and clarify, passing said liquid through a filter and a refrigerator, and bottling the liquid and maintaining a pressure in the apparatus, substantially as set forth.

3. The progressive method of preparing and bottling wine, consisting in delivering the contents of bottles composed of young and old wine and sugar progressively into a vat, allowing such contents of the vat to ferment and clarify, maintaining a pressure of carbonic-acid gas within such vat, passing the clarified wine from such vat through a filter and through a refrigerator, and filling the same progressively into bottles under pressure, substantially as set forth.

4. The progressive method of preparing and bottling wine, consisting in delivering the contents of the bottles progressively into a vat, together with young wine and sugar, allowing the contents of such vat to ferment and clarify, maintaining a pressure of carbonic-acid gas within the apparatus, and passing the clarified wine progressively into bottles, substantially as set forth.

Signed by me this 5th day of November, 1890.

GEO. W. SESSIONS.

Witnesses:
LEMUEL W. SERRELL,
GEO. T. PINCKNEY.